(12) United States Patent
Wells et al.

(10) Patent No.: US 11,643,024 B1
(45) Date of Patent: May 9, 2023

(54) BAY BUDDY

(71) Applicants: Roy Wells, Murphy, TX (US); Joachim Schaab, Farmersville, TX (US)

(72) Inventors: Roy Wells, Murphy, TX (US); Joachim Schaab, Farmersville, TX (US)

( * ) Notice: Subject to any disclaimer, the term of this patent is extended or adjusted under 35 U.S.C. 154(b) by 324 days.

(21) Appl. No.: 17/011,417

(22) Filed: Sep. 3, 2020

Related U.S. Application Data (60) Provisional application No. 62/895,555, filed on Sep. 4, 2019.

(51) Int. Cl.
*B60R 11/06* (2006.01)
*B60R 11/00* (2006.01)

(52) U.S. Cl.
CPC ....... *B60R 11/06* (2013.01); *B60R 2011/0038* (2013.01); *B60R 2011/0059* (2013.01)

(58) Field of Classification Search
CPC ............. B60R 11/06; B60R 2011/0038; B60R 2011/0059
See application file for complete search history.

(56) References Cited

U.S. PATENT DOCUMENTS

| | | | | |
|---|---|---|---|---|
| 1,434,350 A * | 10/1922 | Collins | ........... | B60R 11/06 224/539 |
| 2,979,190 A * | 4/1961 | Daigle | ........... | B25H 5/00 224/42.31 |
| 5,195,778 A * | 3/1993 | Dismuke | ........... | B60R 11/06 428/31 |
| 5,945,194 A * | 8/1999 | Pester | ........... | B60J 11/06 428/192 |
| 9,115,969 B2 * | 8/2015 | Goodwin | ........... | F42B 39/26 |
| 10,058,465 B1 * | 8/2018 | Lanner | ........... | E01F 13/028 |
| 11,147,396 B2 * | 10/2021 | McMillan | ........... | A47F 5/0018 |
| 2002/0170934 A1 * | 11/2002 | Haspel | ........... | B60R 7/02 224/311 |
| 2003/0150892 A1 * | 8/2003 | Hoe | ........... | B60R 7/043 224/275 |
| 2006/0226322 A1 * | 10/2006 | Spellman | ........... | B60R 11/00 248/306 |
| 2009/0065540 A1 * | 3/2009 | Pantoja | ........... | B60R 11/02 224/275 |
| 2017/0313260 A1 * | 11/2017 | Minn | ........... | B60R 11/02 |
| 2018/0161974 A1 * | 6/2018 | Valenzuela | ........... | B65D 33/14 |
| 2019/0084496 A1 * | 3/2019 | Pope | ........... | B60R 5/00 |
| 2019/0263326 A1 * | 8/2019 | Yu | ........... | F16M 13/022 |
| 2022/0111798 A1 * | 4/2022 | Neely, III | ........... | B60R 9/065 |

\* cited by examiner

*Primary Examiner* — Ko H Chan
(74) *Attorney, Agent, or Firm* — Wilson Daniel Swayze, Jr.

(57) ABSTRACT

A tool tray securely and removably positioned on the hood of a vehicle with an expandable mounting bar and hooks is disclosed. The tool tray could assist the technician by bringing and holding tools and lights to the workplace area. The tool tray comprises a box for holding tools and parts when the technician is servicing engine parts. The box is provided with ridges, pockets, and recesses, which are molded into the bottom portion. The box further comprises multiple slots, configured to receive customizable partition panels. One or more magnetic strips are securely positioned at the front portion and within the interior surface of the box, configured to retainably hold the ferrous objects such as the tools and fasteners. The tool tray further comprises light fixtures, gooseneck lights, and a power source, positioned at the bottom portion of the tool tray, configured to provide light or illuminate the work area.

13 Claims, 9 Drawing Sheets

BAY BUDDY

BACKGROUND OF THE INVENTION

A. Technical Field

The present invention generally relates to an automotive repair product. More specifically, the present invention relates to a toolbox that has been designed to securely mount under a hood and/or a bonnet and over the engine bay of a vehicle and configured to hold tools, parts, and fasteners removed from the engine when an automobile technician is actively engaged in servicing a vehicle's mechanisms in the engine compartment.

B. Description of Related Art

The modern automobile has many things in common with the very first automobiles produced. The basic structure of the everyday consumer vehicle has not changed significantly in concept in the many years since its introduction. The 3-box design is still the standard construction, and even the sport utility vehicle (SUV) is not that different from panel trucks and the station wagon of previous generations. One of the most significant things that the modern vehicle has in common with its previous incarnations is it is still an assembly of many parts, and as the car has progressed through years, the list of parts has grown longer. However, the number of parts required to made the vehicle, for example, a car would be a fraction of the number of parts needed for almost any newer model automobile in the current marketplace.

The effort required by an automotive technician to keep a track of all the parts and all the things that can go wrong with the vehicle, for example, a car requires modern technology and lots of experience. Finding issues and servicing all the different makes and models currently available is a daunting undertaking by any individual and any device that can assist a service technician would certainly be welcome.

One of the most challenging tasks, when servicing or repairing the vehicle, for example, a car is keeping the tools available and in the proximity of the particular job that is being done. Most service work is performed under the hood or bonnet of the vehicle, for example, a car where there is no place to rest a tool or a part that needs to be installed or removed. Placing a tool on a surface in the engine bay of the vehicle usually results in the tool being dropped, resulting in lost time and frustration looking for the instrument. The same could be said for small parts that may only be removed to gain access to some other area of the engine. Small bolts and screws that attach the parts are notorious for getting lost or misplaced. A lot of time is wasted looking for small items and if not found, can damage other parts or can flatten tires if not relocated to their proper position.

Currently, the automotive technician/mechanic working on the engine typically has a toolbox nearby to source the tools required for the repair. They also typically have one or two magnetic bowls into which the fasteners and small parts being removed during the repair are placed. Additionally, they often have trouble light to illuminate the area upon which they are working. Many times, one or other support items are displaced or parts spilled, making a big mess and causing inefficiency in the repair, increasing labor costs and reducing profits, while irritating the technician. Lighting can also be an issue when servicing especially under the hood or bonnet of the vehicle. Drop lights and trouble lights are often 110-volt affairs that have the typical long cords that are associated with them. Long cables could become tangled or twisted in equipment or become damaged and is very dangerous. The issues for the automotive technician are complicated enough, and the added stress of dropped or lost tools and parts is a source of frustration and is inefficient.

Therefore, there is a need for a tool tray that has been designed to securely mount under a hood or a bonnet and over the engine bay of the vehicle. Further, there is also a need for a tool tray with a light underneath that used to securely hold necessary tools, parts, and fasteners at a more convenient location for the mechanic or user especially when working under the hood or bonnet of the vehicle.

SUMMARY OF THE INVENTION

The present invention generally discloses a tool tray. Further, the present invention discloses a toolbox or tool tray that has been designed to securely mount under a hood and/or a bonnet and over the engine bay of a vehicle and configured to hold tools, parts, and fasteners removed from the engine when an automobile technician is actively engaged in servicing a vehicle's mechanisms in the engine compartment.

According to the present invention, the tool tray is designed to assist the automotive technician by bringing and holding tools, lights, and temporary storage to the immediate work area. In one embodiment, the tool tray comprises a box or tray for holding multiple tools and parts when the technician is actively engaged in servicing a vehicle's mechanisms in the engine compartment. In one embodiment, the tool tray could be securely and removably positioned on the hood or bonnet of the vehicle with an expandable mounting bar. In one embodiment, the expandable mounting bar could be, but not limited to, telescopic rods. In one embodiment, the expandable mounting bar is configured to mount the tool tray under the hood or bonnet of the vehicle.

In one embodiment, the expandable mounting bar of the tool tray comprises hooks on both sides. The hooks on both sides of the expandable mounting bar are securely and safely engaged to the hood or bonnet of the vehicle. In one embodiment, the hooks may define any shape sufficient to engage the edges of the vehicle's hood. In one embodiment, one hook is fixed to one side of the hood and another hook of the expandable mounting bar is rotatably and adjustably affixed to another edge of the hood of the vehicle. In one embodiment, the expandable mounting bar is extruded from, but not limited to, 6061 Alloy aluminum. In one embodiment, the expandable mounting bar is configured to unlock and pull out to retract and safely fit over the hood of the vehicle by compressing and twisting in other direction. In one embodiment, the hooks are padded using, but not limited to, high-density EVA tool-grip rubber so they will not damage the finish on the vehicle. The rubber grips could also prevent the hooks from sliding along the edge of the hood even when the hood is raised.

In one embodiment, the box or tray is made of, but not limited to, plastic. In one embodiment, the box is injection molded from polypropylene plastic. In one embodiment, the box of the tool tray is capable to support the tools, fasteners, and parts up to, but not limited to, 10 pounds without any degradation. In one embodiment, the box could be provided with reinforcing ridges, component pockets, and device recesses, which are molded into the bottom portion of the box with integral support tubes. In one embodiment, the box further comprises a plurality of slots or divider supports and magnetic bar recesses, which are molded in as part of the box. In one embodiment, the box further includes one or more magnetic strips. In one embodiment, the magnetic strips are securely positioned at the front portion and within the interior surface of the box. The magnetic strips are configured to retainably fasten the tools, parts, and fasteners of the engine. In one embodiment, the customizable partition panels could be securely positioned in the box via the slots. The slots are molded as a part of the box, configured to receive the customizable partition panels. In one embodiment, the customizable partition panels are configured to divide the box into shelves/dividers and separate the tools and parts, thereby preventing from mixing up and damages. In one embodiment, the customizable partition panels could be slidably positioned into the slots of the box of the tool tray.

In one embodiment, the tool tray could be securely supported over the engine bay of the vehicle using a pair of support bars. In one embodiment, the pair of support bars are securely positioned on a bottom portion of the tool tray. In one embodiment, one ends of the pair of support bars are removably affixed to the vehicle's body and other ends are securely affixed to the bottom portion of the tool tray for support. In one embodiment, the pair of support bars could be, but not limited to, telescopic rods. In one embodiment, the pair of support bars are adjustable and mounted on the box of the tool tray using a ball/socket joint to allow optimum positioning during use.

In one embodiment, the one or magnetic strips are securely affixed to a front portion of the box of the tool tray. In one embodiment, the magnetic strips are configured to retainably receive and hold the ferrous objects such as, but not limited to, the tools, for example, pliers and wrenches or spanners, parts, and fasteners, which are used for disassembling and assembling the parts of the vehicle during repairing. In one embodiment, the supporting bars are securely positioned on the bottom portion of the box of the tool tray.

In one embodiment, the tool tray further comprises one or more light fixtures, one or more gooseneck lights, and a power source. In one embodiment, the light fixtures are securely affixed to the bottom portion of the box of the tool tray. The light fixtures are configured to provide light or illuminate the work area while using. In one embodiment, the light fixtures could be, but not limited to, lamps and light emitting diode (LED) flood light (500 lumens). In one embodiment, the gooseneck lights could be, but not limited to, LED daylights. The gooseneck lights are configured to bend and position to illuminate light into dark nooks and crannies. The light fixtures and gooseneck lights are controlled with a switch, for example, a sealed tactile membrane switch, mounted on, but not limited to, the rear left-hand side of the tray tool. In one embodiment, the gooseneck lights further include on/off switches and could be turned off while leaving the light fixtures turned-on. In one embodiment, the light fixtures and the gooseneck lights further comprise control or driver modules, which regulate the voltage levels for supplying power to the lights to operate at the optimum power consumption and brightness.

In one embodiment, printed circuit boards (PCBs) are used for mounting the electronic components such as, but not limited to, LED floods, smart charger module, battery management module, of the tool tray. In one embodiment, the tool tray further comprises a control panel. In one embodiment, the control panel includes a switch and a charging port. In one embodiment, the switch could be, but not limited to, an ON/OFF switch, a power button, and/or a touchscreen.

In one embodiment, the power source could be, but not limited to, a battery and a Li-Ion battery. The power source is configured to provide power to the electronic components of the tool tray. In one embodiment, power source, for example, Li-Ion battery is managed using a smart charger chip to prevent over-heating. In one embodiment, a charging port and an indicator are provided on the rear side of the box of the tool tray. The charging port could enable the user to charge the power source, for example, a battery using an adapter and a charging cable.

In one embodiment, the tray tool could be supplied with a pair of gas strut locks, upon which the support bars or adjustable legs could be attached. In another embodiment, the support bars could be extended down to the fender's gap and be adjusted to the optimum length to assist and support the tray tool. The pair of gas strut locks are machined out of using, but not limited to, alloy 430 (magnetic) stainless-steel alloy using a CNC machining center. The pair of gas strut locks are supplied with knob screw with an internal non-marking pad that grips the gas shock shaft without marking it.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
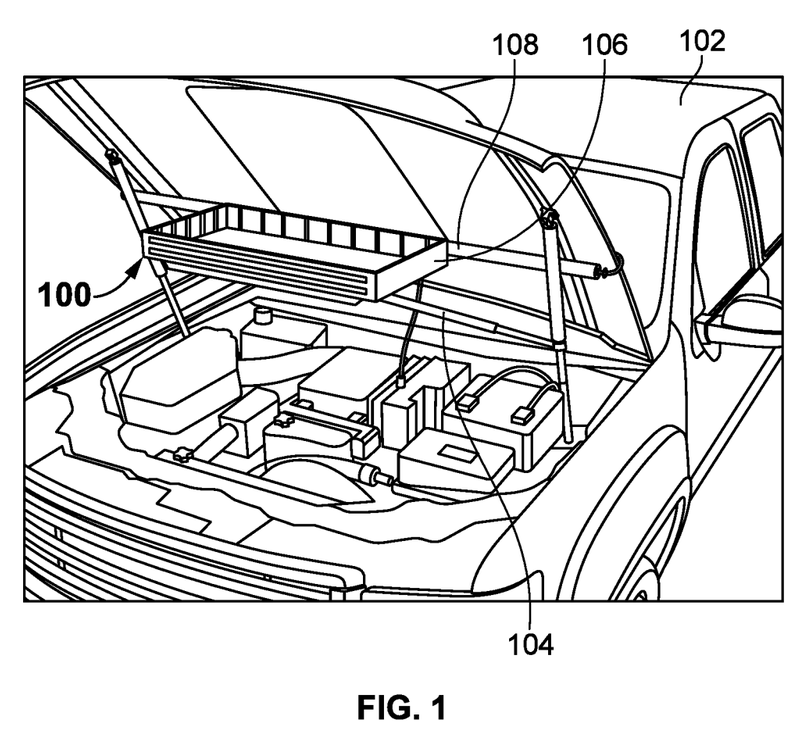
FIG. 1 shows a perspective view of a tool tray securely positioned on a hood or a bonnet of a vehicle in an embodiment of the present invention.

Referring to FIG. 1, a tool tray 100 securely positioned on a hood or a bonnet of a vehicle 102 is disclosed. In one embodiment, the tool tray 100 is an innovative automotive repair product that has been designed to mount under the hood over the engine bay of a vehicle 102 and hold tools, parts, and fasteners removed from the engine when an automobile technician is actively engaged in servicing a vehicle's mechanisms in the engine compartment. In one embodiment, the tool tray 100 is designed to assist the automotive technician by bringing and holding tools, lights, and temporary storage to the immediate work area. In one embodiment, the tool tray 100 comprises a box or tray 106 for holding multiple tools and parts when the technician is actively engaged in servicing a vehicle's mechanisms in the engine compartment. In one embodiment, the tool tray 100 could be securely and removably positioned on the hood or bonnet of the vehicle 102 with an expandable mounting bar 108. In one embodiment, the expandable mounting bar 108 could be, but not limited to, telescopic rods. In one embodiment, the tool tray 100 could be flexibly mounted under the hood or bonnet and over the engine bay of any vehicle such as, but not limited to, cars, sports utility vehicles (SUVs), and multi-utility vehicles (MUVs).

Figure 2:
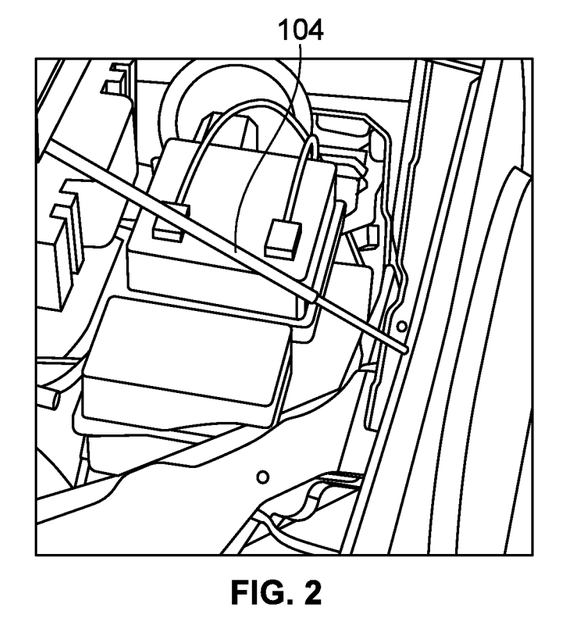
FIG. 2 shows an upper perspective view of a support bar configured to support the tool tray in another embodiment of the present invention.
Figure 3:
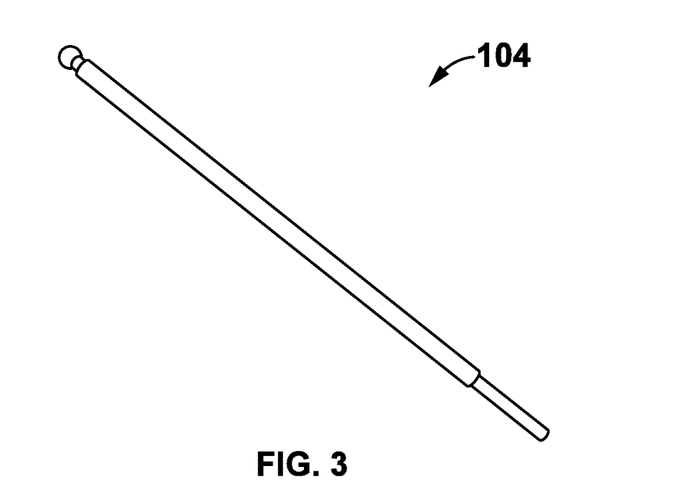
FIG. 3 shows a perspective view of a support bar of the tool tray in one embodiment of the present invention.

Referring to FIGS. 2-3, the tool tray 100 supported on a pair of support bars 104 is disclosed. In one embodiment, the tool tray 100 could be securely supported over the engine bay of the vehicle 102 (shown in FIG. 1) using a pair of support bars 104. In one embodiment, the pair of support bars 104 are securely positioned on a bottom portion of the tool tray 100. In one embodiment, tool tray 100 is supported on the pair of support bars 104, which are removably affixed to a pair of gas strut locks 138 (shown in FIG. 11). In another embodiment, one ends of the pair of support bars 104 are removably affixed to the vehicle's body and other ends are securely affixed to the bottom portion of the tool tray 100 for supporting. In one embodiment, the pair of support bars 104 could be, but not limited to, telescopic rods. The pair of support bars 104 are configured to extend and retract so that the tool tray 100 could removably mounted under the hood or bonnet of any vehicle 102, for example, a car.

In one embodiment, the pair of support bars 104 are adjustable and mounted on the box 106 of the tool tray 100 using a ball/socket joint to allow optimum positioning during use. In one embodiment, each support bar 104 includes a smaller tube and a larger tube, wherein the smaller diameter tubing slides within the larger diameter tubing. In one embodiment, each support bar 104 further includes a press to lock system. In one embodiment, the pair of support bars 104 are extruded using, but not limited to, 6061 Alloy aluminum. After assembly, the tubes are anodized and dyed a vibrant color to provide and durable and corrosion resistant surface. The tube color can match, complement, or contrast with the tray color to make a very distinctive product. The end of the smaller tube has an opening to allow attachment of the leg to the strut lock and a rubber cushioning tip to allow it rest upon the vehicle paint without scuffing it.

Figure 4:
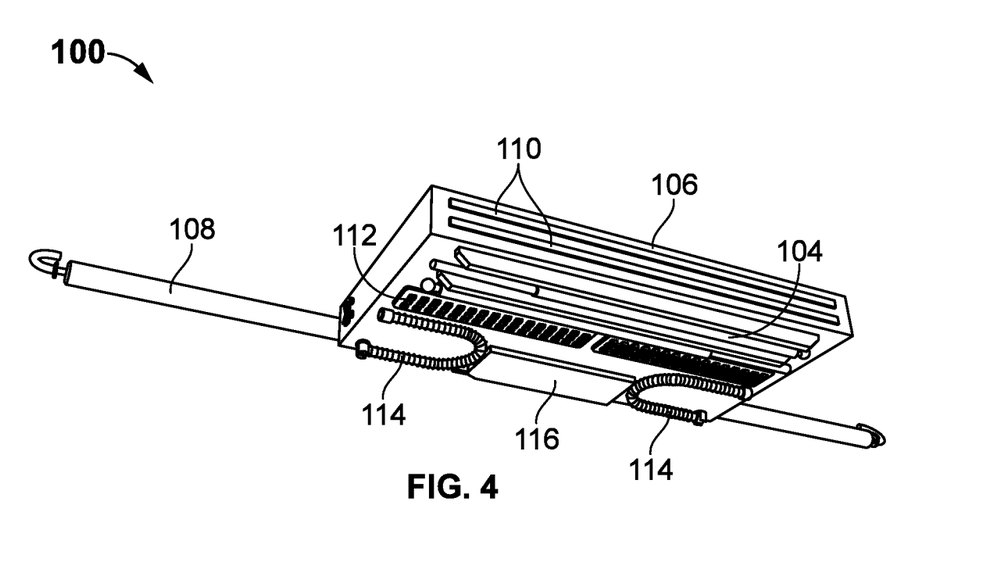
FIG. 4 shows a bottom perspective view of the tool tray in one embodiment of the present invention.
Figure 5:
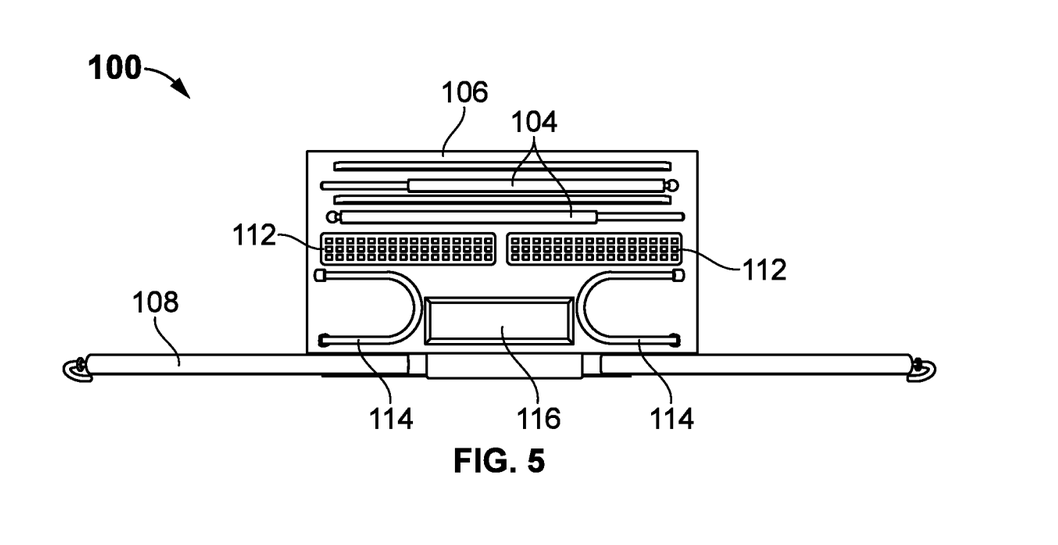
FIG. 5 shows a bottom view of the tool tray in one embodiment of the present invention.

Referring to FIGS. 4-5, the tool tray 100 includes one or more magnetic strips 110 are disclosed. In one embodiment, the one or magnetic strips 110 are securely affixed to a front portion of the box 106 of the tool tray 100. In one embodiment, the magnetic strips 110 are configured to temporarily hold the tools, for example, pliers and wrenches or spanners, parts, and fasteners, which are used for disassembling and assembling the parts of the vehicle 102. In one embodiment, the supporting bars 104 are securely positioned on the bottom portion of the box 106 of the tool tray 100.

In one embodiment, the tool tray 100 further comprises one or more light fixtures 112. The light fixtures 112 are securely affixed to the bottom portion of the box 106 of the tool tray 100. The light fixtures 112 are configured to provide light or illuminate the work area while using. In one embodiment, the light fixtures 112 could be, but not limited to, lamps and light emitting diode (LED) flood light (500 lumens). In one embodiment, the bottom portion of the box of the tool tray 100 is configured to securely receive one or more light fixtures 112, one or more gooseneck lights 114, and at least one power source 116. The gooseneck lights 114 are focused and directed to illuminate the exact area being worked upon. In one embodiment, the power source 116 could be, but not limited to, a battery and a Li-Ion battery. The power source 116 is configured to provide power to the electronic components of the tool tray 100. The battery is an 18 Volt, gel Li-Ion sealed battery that has a 2,000 mAHr capacity. In one embodiment, the power source could be charged with a 120/240 VAC adapter, that plugs into the mains supply, and is supplied with a 6' charging cord. In one embodiment, the power source 116, for example, Li-Ion battery is managed using a smart charger chip to prevent over-heating.

In one embodiment, the gooseneck lights 114 could be, but not limited to, LED daylights. The gooseneck lights 114 are 12" long, mounted below the box 106 of the tool tray 100. The gooseneck lights 114 are configured to bend and position to illuminate light into dark nooks and crannies. The light fixtures 112 and gooseneck lights 114 are controlled with a switch 118, for example, a sealed tactile membrane switch, mounted on, but not limited to, the rear left-hand side of the tray tool 100. The lights (112 and 114) will remain on until the charge of the power source 116, for example, a battery is depleted. The user or mechanic could be turned off when not required to conserve the power of the power source 116. In one embodiment, the gooseneck lights 114 further includes on/off switches and could be turned off while leaving the light fixtures 112 turned-on. In one embodiment, the light fixtures 112 and the gooseneck lights 114 further comprise control or driver modules, which regulate the voltage levels for supplying power to the lights to operate at the optimum power consumption and brightness.

In one embodiment, printed circuit boards (PCBs) are used for mounting the electronic components such as, but not limited to, LED floods, smart charger module, battery management module, of the tool tray 100. The PCBs are fabricated to the final assembler's requirements in a world class contract electronic assembler facility. The standard thickness, double sided FR4 circuit board material is populated with surface mounted components where possible. Any through-hole devices are inserted after the surface mounted assembly, soldering, and cleaning. Both circuit boards are designed to have all the components oriented so they can be mounted with the LED illuminators projecting out of the lenses mounted in the housings. After assembly, the PCBs are protected with a moisture adsorption preventive conformal coating.

Figure 6:
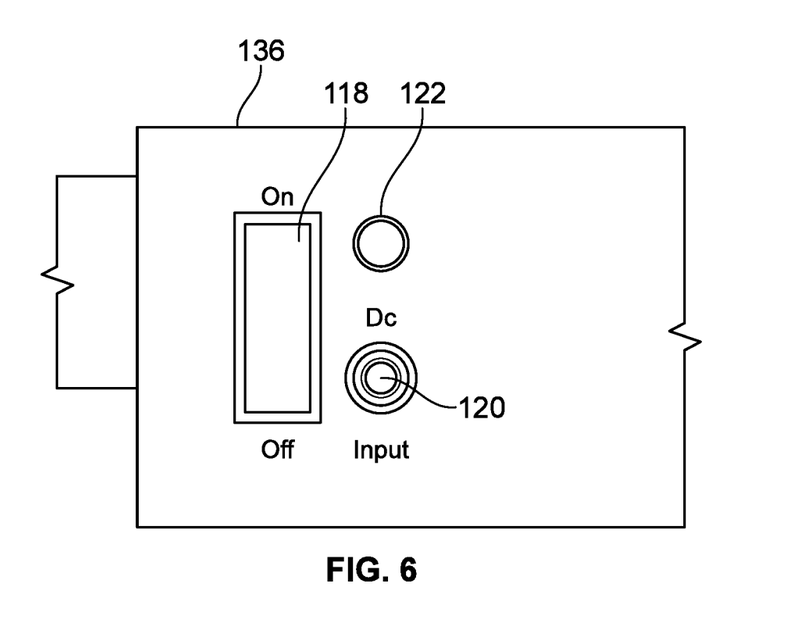
FIG. 6 shows an enlarged view of a control panel of the tool tray in one embodiment of the present invention.
Figure 7:
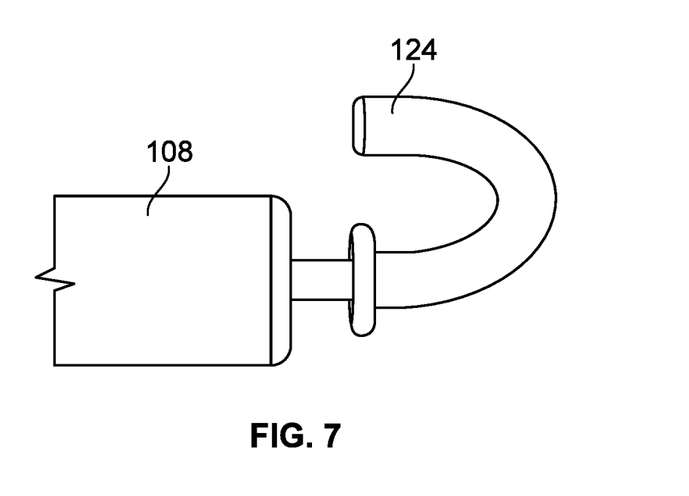
FIG. 7 shows a side and end views of an expandable mounting bar with a hook of the tool tray in one embodiment of the present invention.

Referring to FIG. 6, the box 106 of the tool tray 100 further comprises a control panel 136 is disclosed. In one embodiment, the control panel 136 includes a switch 118, a charging port 120 and an indicator 122. In one embodiment, the switch 118 is securely positioned on a rear side of the box 106 (shown in FIG. 4) of the tool tray 100. The switch 118 enables the user to turn on and turn off the light fixture 112. In one embodiment, the charging port 120 and the indicator 122 are provided on the rear side of the box 106 of the tool tray 100. The charging port 120 could enable the user to charge the power source 116, for example, a battery using an adapter and a charging cable. Referring to FIG. 7, the expandable mounting bar 108 of the tool tray 100 is disclosed. In one embodiment, the expandable mounting bar 108 is configured to mount the tool tray 100 under the hood or bonnet of the vehicle 102. In one embodiment, the expandable mounting bar 108 of the tool tray 100 comprises hooks 124 on both sides. The hooks 124 on both sides of the expandable mounting bar 108 are securely and safely engaged to the hood or bonnet of the vehicle 102. In one embodiment, the hooks 124 may define any shape sufficient to engage the edges of the vehicle's hood. The expandable mounting bar 108 is configured to securely hold the box 106 of the tool tray 100.

In one embodiment, the extendable mounting bar 108 includes rubber coated C-shaped hooks 124 that are attached to both ends. In one embodiment, at least one hook 124 is fixed, which allows it to hold up the tray tool 100 without bends when tightly adjusted against the hood and another end's hook 124 is rotatably and adjustably mounted on the edge of the hood of the vehicle 102. In one embodiment, the expendable mounting bar 108 further comprises a rotation locking device. In one embodiment, the expendable mounting bar 108 is extruded from, but not limited to, 6061 Alloy aluminum. After assembly, the expendable mounting bar 108 is anodized and dyed a vibrant color to provide and durable and corrosion resistant surface. The expendable mounting bar 108 color could match, complement, or contrast with the tray tool 100 color to make a very distinctive product.

Figure 8:
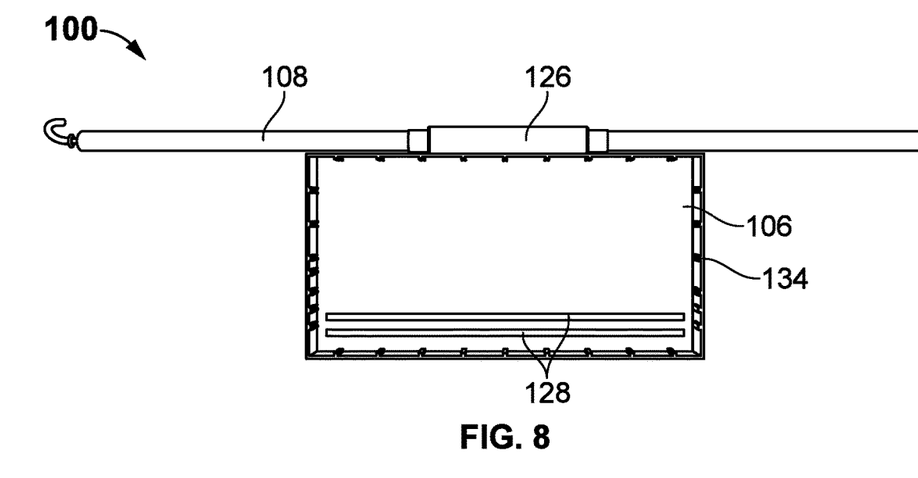
FIG. 8 shows a top view of the tool tray in one embodiment of the present invention.

Referring to FIG. 8, the box 106 of the tool tray 100 is disclosed. In one embodiment, the box 106 is movably and flexibly affixed to the expandable mounting bar 108 using a mounting member 126. In one embodiment, the box 106 further includes one or more magnetic strips 128. The magnetic strips 128 are securely positioned within the interior surface of the box 106. The magnetic strips 128 are configured to removably fasten the tools, parts, and fasteners of the engine. In one embodiment, the box or tray 106 made of, but not limited to, plastic. In one embodiment, box 106 is injection molded from polypropylene plastic. This plastic is very durable, is highly resistant to automotive and household chemicals, resists staining, and is typically used in this type of application. The box/tray 106 could be supplied in almost any vibrant color, so a distinctive color may be chosen to enhance the product recognition factor, which can dramatically improve the market adoption of the product. In one embodiment, the box 106 would be 24" wide and about, but not limited to, 14" deep. The height of the wall of the box 106 is at least, but not limited to, 3". In one embodiment, the box 106 could be provided with reinforcing ridges, component pockets, and device recesses, which are molded into the bottom portion of the box 106 with integral support bars/tubes 104 (shown in FIG. 1) mount as an integral part on the rear portion of the box 106. In one embodiment, the box 106 further comprises a plurality of slots or divider supports 134 and magnetic bar recesses, which are molded in as part of the box 106.

Figure 9:
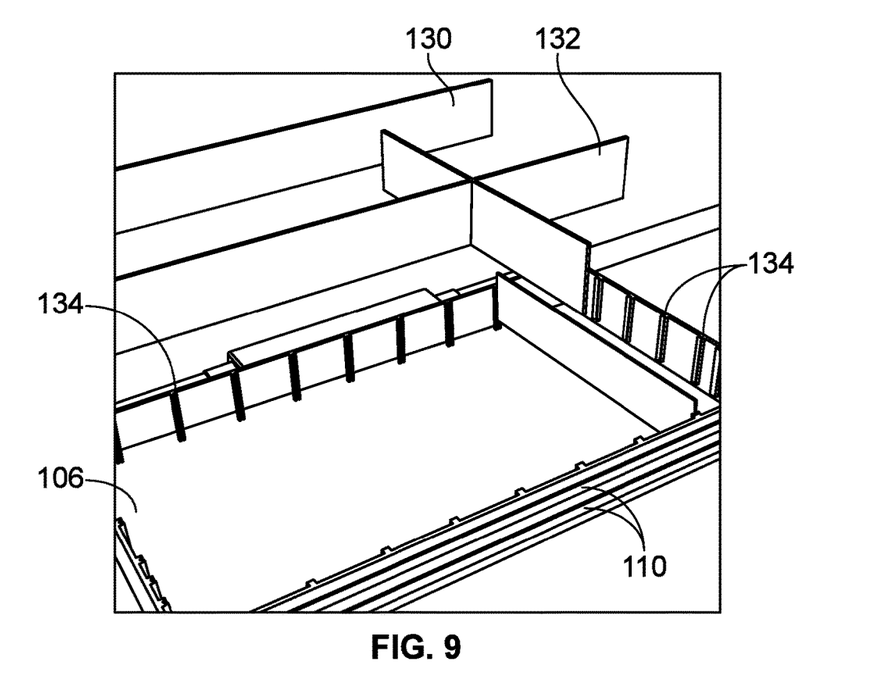
FIG. 9 shows a top perspective view of the box with customizable partition panels of the tool tray in one embodiment of the present invention.
Figure 10:
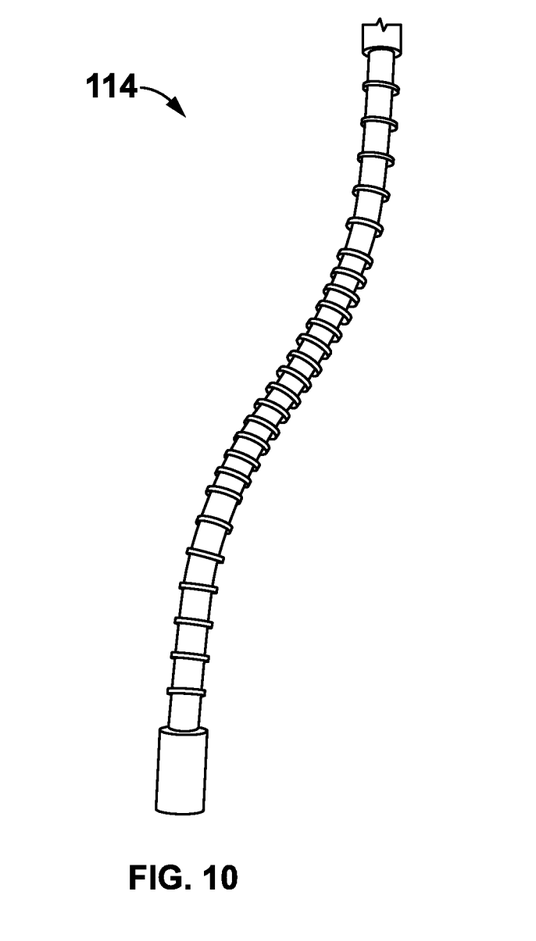
FIG. 10 shows a perspective view of a gooseneck light of the tool tray in one embodiment of the present invention.

Referring to FIG. 9, customizable partition panels (130 and 132) for the box 106 of the tool tray 100 is disclosed. In one embodiment, the customizable partition panels (130 and 132) could be securely positioned in the box 106 via the slots 134. The slots 134 are molded as a part of the box 106, configured to receive the customizable partition panels (130 and 132). In one embodiment, the customizable partition panels (130 and 132) are configured to divide the box 106 into shelves/dividers and separate the tools and parts, thereby preventing from mixing up and damages. In one embodiment, the customizable partition panels (130 and 132) could be slidably positioned into the slots 134 of the box 106 of the tool tray 100. Referring to FIG. 10, the gooseneck light 114 of the tool tray 100 is disclosed. The tool tray 100 includes one or more gooseneck lights 114. In one embodiment, the gooseneck lights 114 are securely positioned at the bottom portion of the box 106. In one embodiment, the gooseneck lights 114 include at least one, but not limited to, a lamp, LEDs, and a lightbulb. The gooseneck lights 114 are flexible and enables the user to adjust the position of the light spot. The gooseneck lights 114 are focused and directed to illuminate the exact area being worked upon.

Figure 11:
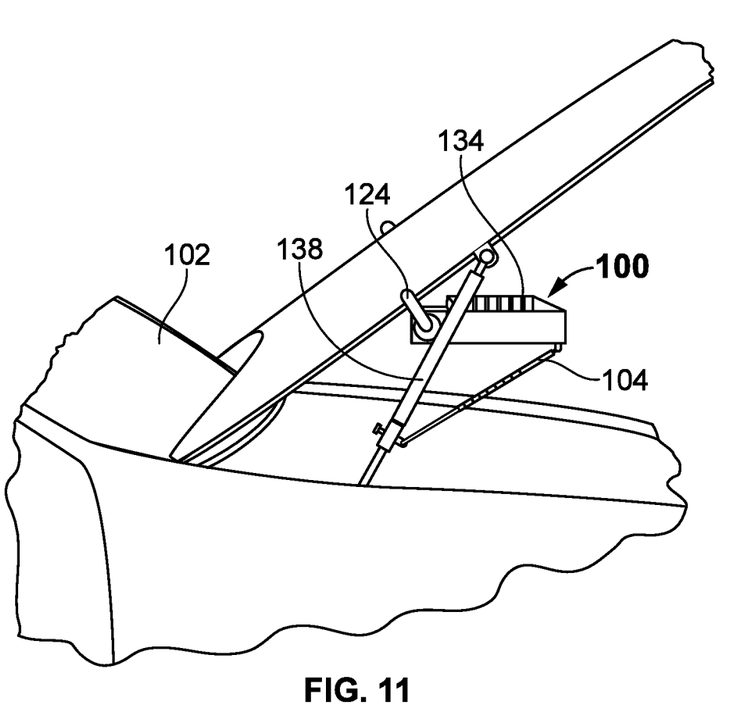
FIG. 11 shows a perspective view of the tool tray mounted on the hood of the vehicle in one embodiment of the present invention.

Referring to FIG. 11, the tool tray 100 mounted on the hood of the vehicle 102 is disclosed. In one embodiment, the tool tray 100 is mounted on the edges of the hood of the vehicle 102 using the hooks 124 of the extendable mounting bar or clamp tube 108. The hooks 124 securely holds the tool tray 100 over the engine bay of the vehicle 100. In one embodiment, the hooks 124 are padded using, but not limited to, high-density EVA tool-grip rubber so they will not damage the finish on the vehicle 102. The rubber grips could also prevent the hooks 124 from sliding along the edge of the hood even when the hood is raised. The extendable mounting bar or clamp tube 108 between the hooks 124 is adjustable and locks into place when the optimum hook spacing is obtained. The extendable mounting bar 108 will adjust the padded hook's spacing from about, but not limited to, 52" and 72", then they could be locked down tightly against the edges of the hood, preventing the tray support tube from rotating even when the tray 106 is loaded. In one embodiment, the hooks 124 could be mounted on the edges of the vehicle's hood at any length between, but not limited to, 52" and 72".

The extendable mounting bar or clamp tube 108 is configured to fit almost any hood or bonnet of the vehicle. The technician or mechanic could use the box 106 of the tool tray 100 for placing and holding the mechanic's tools, any fasteners removed from the vehicle, and any lightweight parts that are to be installed. The slots or ridges 134 are molded into the interior surface of the edge portions of the box 106. The customizable partition panels (130 and 132) (shown in FIG. 9) are slidably placed in the interior surface of the box 106 to meet the job requirements. In one embodiment, the box 106 of the tool tray 100 is capable to support the tools, fasteners, and parts up to, but not limited to, 10 pounds without any degradation. In one embodiment, the box 106 of the tool tray 100 is made of, but not limited to, polypropylene plastic. The pair of support bars 104 are securely positioned on a bottom portion of the tool tray 100.

In one embodiment, one ends of the pair of support bars 104 are removably affixed to the vehicle's body and other ends are securely affixed to the bottom portion of the tool tray 100 for supporting. In one embodiment, the pair of support bars 104 could be, but not limited to, telescopic rods. The pair of support bars 104 are mounted on ball and socket swivels, which could be used to level the box or tray 106 by placing in the fender slot or can snap onto the strut lock of the vehicle 102 to make sure the hood cannot collapse. The strut locks can also be used and the support bars 104 are placed on the fender slot as additional support.

In one embodiment, the tray tool 100 could be supplied with a pair of gas strut locks 138, upon which the support bars or adjustable legs 104 could be attached. In another embodiment, the support bars 104 could be extended down to the fender's gap and be adjusted to the optimum length to assist and support the tray tool 100. The pair of gas strut locks 138 are machined out of using, but not limited to, alloy 430 (magnetic) stainless-steel alloy using a CNC machining center. The pair of gas strut locks 138 are supplied with knob screw with an internal non-marking pad that grips the gas shock shaft without marking it. Attaching the lock prevents the gas shock from collapsing and inadvertently allowing the hood to close. The outside of the lock is supplied with a ball that the support bar 104 can snap onto it. This is just above the rubber, non-marking tip on the smaller shaft of the support bar 104. When not in use, the strut locks 138 are placed onto the magnetic strip in the interior of the box 106 of tray tool 100, retaining them securely between uses.

Figure 12:
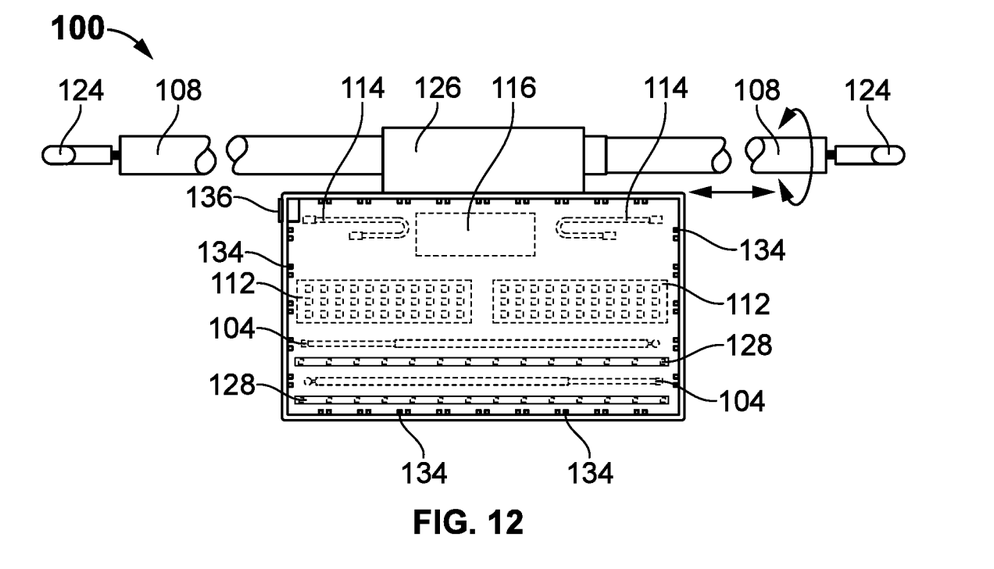
FIG. 12 shows a top view of the tool tray in one embodiment of the present invention.
Figure 13:
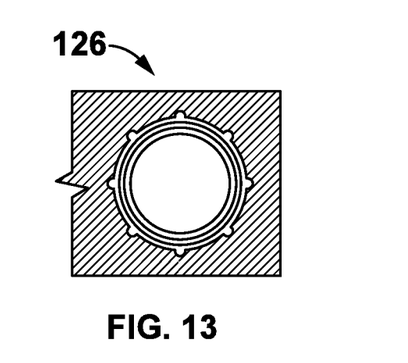
FIG. 13 shows a side view of a mounting member of the tool tray in one embodiment of the present invention.

Referring to FIG. 12, the light fixtures 112, a power source 116, and gooseneck lights 114 are securely poisoned at the bottom portion of the tool tray 100. In one embodiment, one or more magnetic strips 128 are securely positioned at the front side of the interior surface of the box/tray 106. The magnetic strips 128 are configured to retainably receive and hold the ferrous objects such as, but not limited to, tools, parts, and fasteners of the vehicle 102 during repairing. In one embodiment, the bottom surface of the box 106 has at least, but not limited to, light fixtures 112, for example, LED flood lights and gooseneck lights 114. The light fixtures 112, for example, LED flood lights, put out light in, but not limited to, 160 degrees and the gooseneck lights 114 could be adjusted to illuminate directly on the work area. Referring to FIG. 13, the mounting member 126 of the tool tray 100 is disclosed. In one embodiment, the mounting member 126 slidably and rotatably receive the expandable mounting bar 108 via an aperture.

Figure 14:
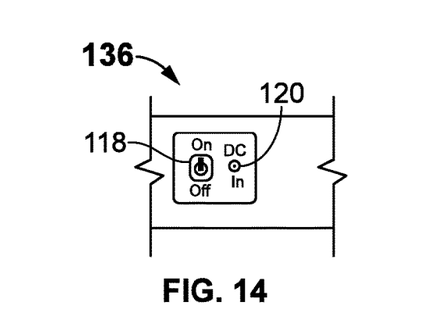
FIG. 14 shows a front view of the control panel of the tool tray in one embodiment of the present invention.

Referring to FIG. 14, the tool tray 100 further comprises a control panel 136. In one embodiment, the control panel 136 includes a switch 118 and a charging port 120. In one embodiment, the switch 118 could be, but not limited to, an ON/OFF switch, a power button, and/or a touchscreen. The technician or mechanic could turn on and turn off the light fixtures 112 using the switch 118. In one embodiment, the charging port 120 is configured to receive a pin of the charging cable for charging the power source 116, for example, battery, using the adapter. In one embodiment, the power source 116 could be, but not limited to, a Li-Ion battery. The power source 116 is large enough in the capacity that it will operate all light fixtures for up to, but not limited to, 4 hours. In one embodiment, the gooseneck lights/flexneck lights 114 could allow the user to provide convenient placement of the light beam during working at the engine bay of the vehicle 102.

In one embodiment, the slots 134 in the side portions of the box 106 could allow the user or mechanic to position the customizable partition panels or dividers (130 and 132), which are supplied with the tray tool 100. In one embodiment, the expandable mounting bar 108 is configured to unlock and pull out to retract and safely fit over the hood of the vehicle 102 by compressing and twisting in other direction. In one embodiment, the hooks 124 rotate with a great deal of resistance while the opposite hook 124 is fixed while supporting the tray tool 100. In one embodiment, the support bars or adjustable legs 104 are snapped into slots molded into the base or bottom portion of the box 106 where they are retained until pulled out for support during use.

Figure 15:
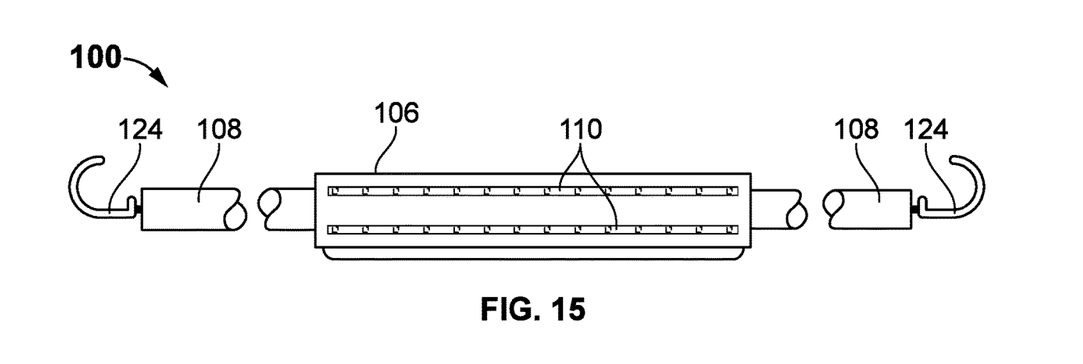
FIG. 15 shows a front view of the tool tray in one embodiment of the present invention.

Referring to FIG. 15, the front surface of the box 106 includes at least, but not limited to, 2 magnetic stainless-steel U channels or magnetic strips 110. The magnetic strips 110 are embedded with strong magnets and adhesively bonded into the front surface of the box 106 to hold tools and other ferrous metal objects. In one embodiment, the box 106 of the tool tray 100 includes a plurality of ridges at the bottom portion. In one embodiment, the ridges at the bottom portion of the box 106 make more rigid to securely hold the support bars 104, the light fixtures 112, and the gooseneck lights 114. In one embodiment, the expandable mounting bar 108 is made of a material, but not limited to, aluminum. The expandable mounting bar 108 could be anodized to provide a unique colored, scratch, and corrosion resistant surface during use. In one embodiment, the hooks 124 are safely mounted on the edges of the hood of the vehicle 102 so that the tray tool 100 does not slip up or down even when loaded at capacity.

The tray tool 100 is designed to be aesthetic and effective in the application. The relative ease of manufacture and the moderately inexpensive components provide good marketability for the manufacturer. The user benefits from improved 'over-bay' part and tool storage during deployment and lighting directly on the workspace, which should provide considerable market interest in the product.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A tool tray designed to securely mounting under a hood and/or a bonnet and over the engine bay of a vehicle, comprising;

the tool tray being configured to hold at least one of a tool and includes a goose neck lamp, a part and a fastener parts, and fasteners removed from the engine of the vehicle:

wherein the tool tray is removably connected to the hood of the vehicle and wherein the tool tray includes an expandable mounting rod to connect to the hood of the vehicle.

2. A tool tray designed to securely mounting under a hood and/or a bonnet and over the engine bay of a vehicle as in claim 1, wherein the expandable mounting rod is connected to a bonnet of the vehicle.

3. A tool tray designed to securely mounting under a hood and/or a bonnet and over the engine bay of a vehicle as in claim 1, wherein the expandable mounting rod includes a telescoping rod to connect to the hood of the vehicle.

4. A tool tray designed to securely mounting under a hood and/or a bonnet and over the engine bay of a vehicle as in claim 1, wherein the tool tray is positioned under the hood of the vehicle.

5. A tool tray designed to securely mounting under a hood and/or a bonnet and over the engine bay of a vehicle as in claim 1, wherein the expandable mounting rod includes a fastener to fasten to the hood of the vehicle.

6. A tool tray designed to securely mounting under a hood and/or a bonnet and over the engine bay of a vehicle as in claim 5, wherein the fastener includes a hook to engage the hood of the vehicle.

7. A tool tray designed to securely mounting under a hood and/or a bonnet and over the engine bay of a vehicle as in claim 6, wherein the hook is formed to engage the edge of the hood of the vehicle.

8. A tool tray designed to securely mounting under a hood and/or a bonnet and over the engine bay of a vehicle as in claim 6, wherein the hook is rotatable with respect to the expandable mounting rod.

9. A tool tray designed to securely mounting under a hood and/or a bonnet and over the engine bay of a vehicle as in claim 1, wherein the expandable mounting rod is formed from aluminum.

10. A tool tray designed to securely mounting under a hood and/or a bonnet and over the engine bay of a vehicle as in claim 6, wherein a hook of the expandable mounting rod is padded to prevent damage to the hood.

11. A tool tray designed to securely mounting under a hood and/or a bonnet and over the engine bay of a vehicle as in claim 10, wherein a padding is formed from rubber.

12. A tool tray designed to securely mounting under a hood and/or a bonnet and over the engine bay of a vehicle as in claim 1, wherein the expandable mounting rod includes a support bar.

13. A tool tray designed to securely mounting under a hood and/or a bonnet and over the engine bay of a vehicle as in claim 12, wherein the support bar is connected to a ball and socket joint to allow the tool tray to be movable.

* * * * *